United States Patent [19]

Juffinger

[11] Patent Number: 5,604,594
[45] Date of Patent: Feb. 18, 1997

[54] DEVICE AND METHOD FOR DETERMINING THE COLOR VALUE OF A LIGHT

[75] Inventor: Josef Juffinger, Thiersee, Austria

[73] Assignee: Schablonentechnik Kufstein Aktiengesellschaft, Kufstein, Austria

[21] Appl. No.: 443,811

[22] Filed: May 18, 1995

[30] Foreign Application Priority Data

May 19, 1994 [EP] European Pat. Off. .............. 94107788

[51] Int. Cl.$^6$ ...................................................... G01J 3/51
[52] U.S. Cl. .......................... 356/405; 356/419; 250/226
[58] Field of Search ..................................... 356/405, 416, 356/419; 250/226

[56] References Cited

U.S. PATENT DOCUMENTS

| | | | |
|---|---|---|---|
| 4,054,389 | 10/1977 | Owen | 356/419 |
| 5,166,755 | 11/1992 | Gat | 356/419 |

FOREIGN PATENT DOCUMENTS

| | | |
|---|---|---|
| 0491131 | 6/1992 | European Pat. Off. . |
| 1411540 | 10/1975 | United Kingdom . |

Primary Examiner—F. L. Evans

[57] ABSTRACT

A device for determining the color value of light includes a linear graded interference filter, which has only one expansion direction through which the light is incident on a number of photodetectors. The photodetectors are arranged adjacent to one another in the expansion direction of the graded interference filter and are used to supply measuring signals, on the basis of which the color value is calculated. Focusing optics arranged in front of the graded interference filter are used to focus the light onto the photodetectors. The light is fed via a plurality of optical guides, whose light exit ends are arranged closely adjacent to one another along one or more rows extending in the expansion direction of the graded interference filter. The focusing optics contain a cylindrical lens extending in the expansion direction. Advantageously, the photodetectors are PIN photodiodes and the optical waveguides are optical fibers. The number of detectors and their position along the expansion direction determine the accuracy of the polygonal approximation of the chromaticity diagram for natural colors, and thus providing more accurate color determination.

19 Claims, 4 Drawing Sheets

DEVICE AND METHOD FOR DETERMINING THE COLOR VALUE OF A LIGHT

BACKGROUND OF THE INVENTION

1. Field of the Invention

The present invention relates to a device for determining the color value of a light flux.

2. Description of Related Art

In general, in the determination of the color value of a radiation, three partial light fluxes of the radiation to be measured are generated and guided via three color filters to photodiodes or phototransistors and converted by the latter into three corresponding electrical signals. On the other hand, the whole light flux to be measured can also be decomposed by an optical grating or a prism into its spectral components, and these are projected onto a diode array, which most often consists of 256 or 512 diodes.

In the case of the decomposition of the whole light flux into three partial light fluxes, this is referred to as an RGB measurement of the light, since this measurement is most often undertaken in the three color ranges red, green and blue. Each of the three color filters respectively allows a different part of the wavelength range of the light flux picked up to pass to the photodiode connected downstream of it. The photodiodes emit a current, which is proportional to the intensity of the loading and to its own sensitivity, used as a measuring signal. The color information obtained here is most often sparse, since the spectral colors lying between the three basic colors red, green and blue are determined only in a manner reduced by the respective filter factor. Also, the color filters normally used for an RGB measurement have a broad pass band of about 100 nm and, accordingly, an average value of the intensity over the entire pass band is measured by the diode connected downstream.

In general, it can be established that the further color components lie from each other on the color circle or in another adequate colors representation, then the closer their mixed value lies to the colors white or grey. If colors are measured only in terms of the components red, green and blue, only these values are available for a later synthesis of these colors and the colors composed from these values then appear milky white in the case of light shades or dull to grey in the case of dark shades. Brilliant colors are, in contrast, always pure spectral colors or mixtures of closely adjacent spectral colors.

A color measurement leading to brilliant colors is achieved with the aid of the spectral decomposition of the light flux to be measured, by means of an optical grating or a prism, as already mentioned above. Unfortunately, considerable light losses result in both arrangements. In the case of the grating, losses result from the fact that the other orders of diffraction also receive light. In the case of prisms, in particular for short overall lengths of the optical equipment, a multiple prism arrangement is necessary, which exhibits strong reflection and absorption losses and by means of which the enclosed space is in stark contradiction to the often necessary miniaturization of the measuring electronics. Nevertheless, the spectrum generated is mostly only of a short length and diode arrays are therefore almost exclusively used, of which the most conspicuous disadvantage is that they can read out only slowly. Also, the fine spectral resolution requires a correspondingly narrow and thus unfortunately low-light gap, since otherwise the images of the gap in the individual wavelength ranges overlap and destroy the resolution achieved by means of the grating or prism. This effect slows down the reading-out considerably.

A device of the generic type for determining the color value of a light flux is disclosed in a brochure of the firm OCLI, 2789 Northpoint Parkway, Santa Rosa, Calif. 95407-7397. This known device has a linear graded interference filter, which has only one expansion direction and through which a light flux is incident on a number of photodiodes, which are arranged adjacent to one another in the expansion direction of the graded interference filter and are used to supply measuring signals, on the basis of which the color value is calculated. The photodiodes are present in a 256-diode array, which is connected to a corresponding evaluation circuit for the measuring signals. Focusing optics are arranged in front of the graded interference filter, in order to focus the light flux coming from a halogen lamp, after reflection at a sample, onto the photodiodes.

SUMMARY OF INVENTION

An object of the present invention is to provide a device suitable for point-by-point scanning, at high light values, a rapidly moving surface.

The objects of the present invention are fulfilled by providing a device for determining the color value of a light flux which includes a linear graded interference filter having an expansion direction, wherein the light beam is fed via a plurality of optical fibers, whose light exit ends are arranged closely adjacent to one another along one or more rows extending in the expansion direction, the focusing optics contain a cylindrical lens extending in the expansion direction of the graded interference filter, and the photodiodes are designed as PIN diodes.

Only by means of the combination of all the features specified is a sufficiently rapid reading-out of color values on the moving surface possible. The optical fiber arrangement together with the cylindrical lens furnish the advantage of maximum light flux application onto the photodiode array. The use of separate PIN photodiodes in the diode array has, furthermore, the advantage of the smallest possible diode capacitance, as a result of which a corresponding diode current is quickly established even in the case of relatively weak irradiations.

The rapidly moving surface can, for example, be the outer surface of a cylinder, on which a pattern is clamped, of which the color is to be scanned point by point. For this purpose, the cylinder, which can be present as a solid or hollow cylinder, is rotated about its longitudinal axis and, with it, the pattern lying on its outer surface. The pattern is illuminated point by point, all light input ends of the optical fibers being aligned onto this point, in order to detect the light reflected back from it (by reflection or scattering). If the illumination device and the light detection device are moved uniformly along a guide, extending in the cylinder longitudinal direction, parallel to the cylinder outer surface, then, during rotation of the cylinder, it is possible to measure, one after another, color points which lie closely adjacent to one another and are arranged along a helical path on the cylinder outer surface.

According to an advantageous refinement of the invention, the focusing optics and the graded interference filter, on the one hand, and the photodiodes, on the other hand, can be displaced relative to one another in the expansion direction of the graded interference filter, in order to be able to undertake a fine adjustment of the components with respect to one another. In this arrangement, the focusing optics and the graded interference filter can be clamped in a common frame, which is supported so as to be displaceable in the expansion direction of the graded interference filter. By means of the frame, a relative movement between graded interference filter and focusing optics is avoided, as a result of which the adjustability is considerably facilitated.

According to a further refinement of the invention, the common frame is held in a central clamping body, which is rigidly connected to a basic body, which carries the photodiodes. The photodiodes, in this arrangement, are combined in one component as an array, which is seated on a base which is fastened to the base body. On that side of the central clamping body facing away from the base body, an outer clamping body, which receives the light exit ends of the optical fibers in a fixed manner, is rigidly connected to the central clamping body. All of the bodies, in this arrangement, can be connected to one other in a fixed manner, for example they can be pinned to one another. Nevertheless, no clamping forces act, in this arrangement, on the component designed as an array, nor do clamping forces act on the base carrying this component, since the base is fixed separately on the base body and is not mechanically loaded by the central clamping body.

In principle, use can be made of all linear graded interference filters which have a suitable band pass characteristic, which can lie, for example, at 20 nm. On the other hand, it has been shown that, for the later synthesis of brilliant mixed colors, it is sufficient to envisage fewer than 256 reference points, for example only 10 reference points in different regions of the visible spectrum, in order to be able to detect different color components of the light flux coming from the patterned original. As a result of the low number of reference points necessary, therefore, it is possible to use separate PIN photodiodes which have a relatively large expansion, this giving rise, on the other hand, to the advantage of relatively rapid reading-out, specifically even when the light flux to be measured is relatively weak. As already mentioned, the PIN photodiodes have only a small diode capacitance, so they have a good response behaviour.

According to another refinement of the invention, each of the photodiodes is connected, via a preamplifier, to a parallel circuit of three resistors, which are connected on the output side to various inputs of a total of three output amplifiers present. By means of the three output amplifiers present, three color signals X, Y, Z are thus supplied, from which mixed colors are later synthesized, components from all the measuring signals of all the photodiodes used being used for the production of each of the color signals X, Y and Z. Nevertheless, these components are weighted differently, as a function of the respective position of the photodiodes in the spectrum. The relationships are generally known from colorimetrics and do not need to be explained here in detail. A further scope of applicability of the present invention will become apparent from the detailed description given hereinafter. However, it should be understood that the detailed description and the specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

Hereinafter, an exemplary embodiment, given by way of illustration only, and thus is not limitative, of the invention is described in more detail with reference to the drawing, in which.

DETAILED DESCRIPTION OF THE PREFERRED EMBODIMENTS

Figure 1:
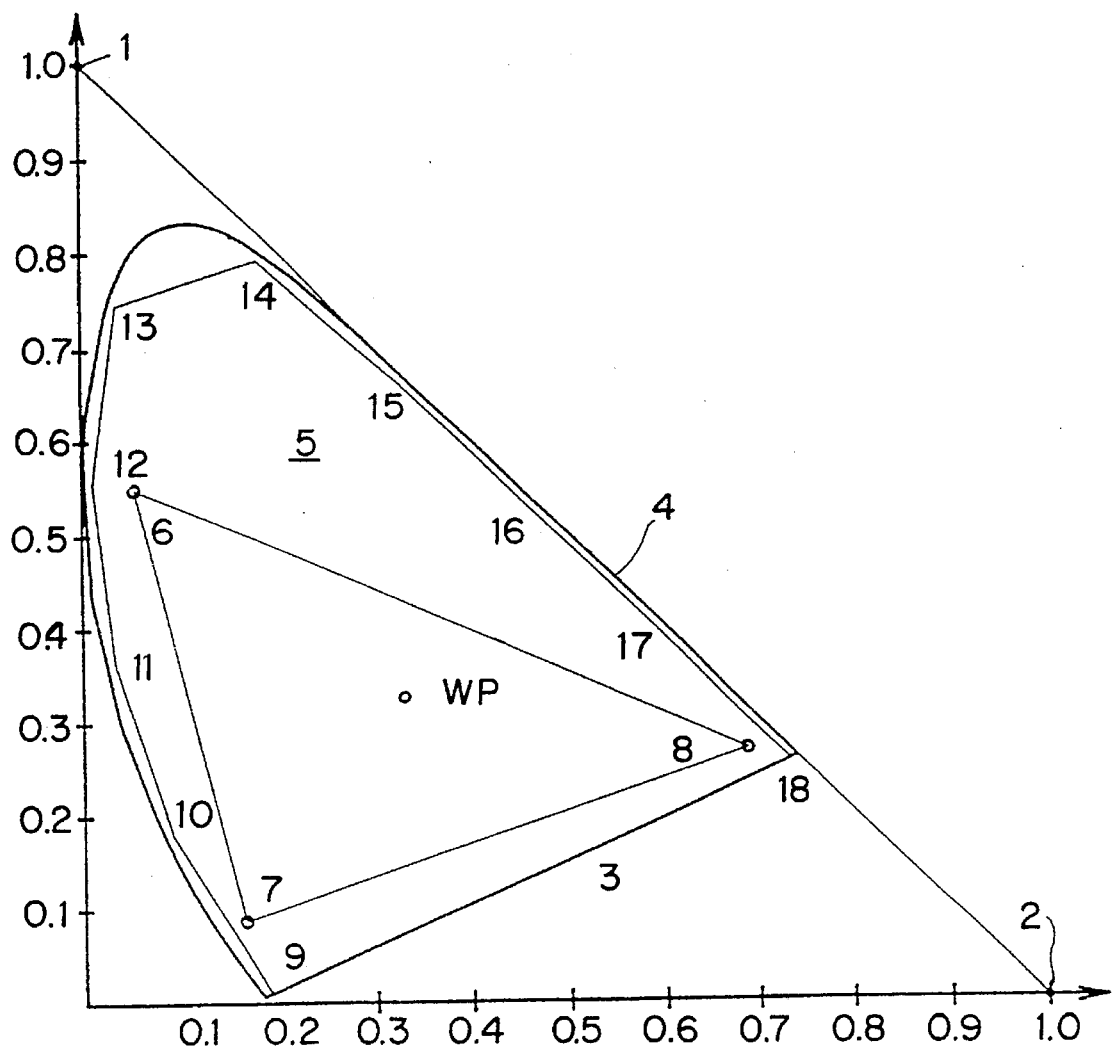
FIG. 1 shows a standardized color chart, having virtual colors X, Y and Z, not present in the spectrum, to explain the background of the invention.

FIG. 1 shows a standardized color chart, i.e., a chromaticity diagram known per se, having virtual colors X, Y and Z, not present in the spectrum, demonstrating the principles of color mixing. This representation of the colors in this diagram, with the virtual colors X, Y and Z, has the advantage that all colors can be plotted in the region of the positive semi-axis. The color 1 on the ordinate of the color chart according to FIG. 1 at the value 1 is the virtual color Y, while the color 2 on the abscissa in FIG. 1 at the abscissa value 1 represents the virtual color X. All pure spectral colors lie on the heavily drawn outline 4, specifically the color blue lies at the end of the outline 4, approximately at point 9, while the color red lies at the other end, approximately at point 18. Lying on the straight line 3, between the points 9 and 18, which joins the ends of the curved outline 4, are the purple shades, which are mixed colors from red and blue. All the other mixed colors lie in the interior of the region 5, which is enclosed by the outline 4 and the straight line 3. All color values which lie outside the region 5 are not present in nature.

The mixtures of two spectral colors lie on the straight line joining their points of representation. If two mixed colors are chosen in the interior of the region 5, then all the mixtures of these mixed colors in turn lie on a straight line joining the two points of representation of the mixed colors. It can easily be seen that, in the case of a mixture of three mixed colors, all these colors lie in the interior of a triangle which is described by the three points of representation of the initial mixed colors as triangle corner points.

The colors determined by means of RGB filtering are, in accordance with their being obtained via filters having a finite pass band, likewise mixed colors and therefore not spectral colors. If these colors are plotted in the diagram, the colors 6 (green), 7 (blue) and 8 (red) lie in the interior of the region 5 and not on the outline 4. The RGB triangle joining these color points then bounds exactly that region which can be represented and described by these colors, and it can clearly be seen that this region is very much smaller than the region in the interior of the outline 4 represented by the spectral colors.

In the case of the device according to the invention, the color information is obtained by the use of a linear graded interference filter having a very narrow band pass characteristic (20 nm) over the entire visible wavelength range. The latter means that, at each point of the filter, a wavelength range of 20 nm is able to pass through in an essentially unattenuated manner, the average wavelength in the expansion direction of the graded interference filter, however, changing linearly with the coordinate in this direction. If, in the case of the device according to the invention, for example ten separate photodiodes (PIN photodiodes) are used, and if the individual measured values of these ten photodiodes are plotted in the diagram in accordance with FIG. 1, then an outlining polygon having the reference points 9 to 18 is obtained, which, although it also lies within the course of the curve 4, nevertheless fits considerably better to this curve course than the RGB triangle formed by the points 6, 7 and 8. It can be seen from this that the color scanner construction in accordance with the present invention detects a considerably larger color range than an RGB filtering. It should be pointed out further that the separation of the reference points from the outline 4 is to be traced back, for the most part, to the integration of the wavelength ranges incident on an individual diode. The component which the band pass characteristic contributes to this spacing, is substantially smaller.

Figure 2:
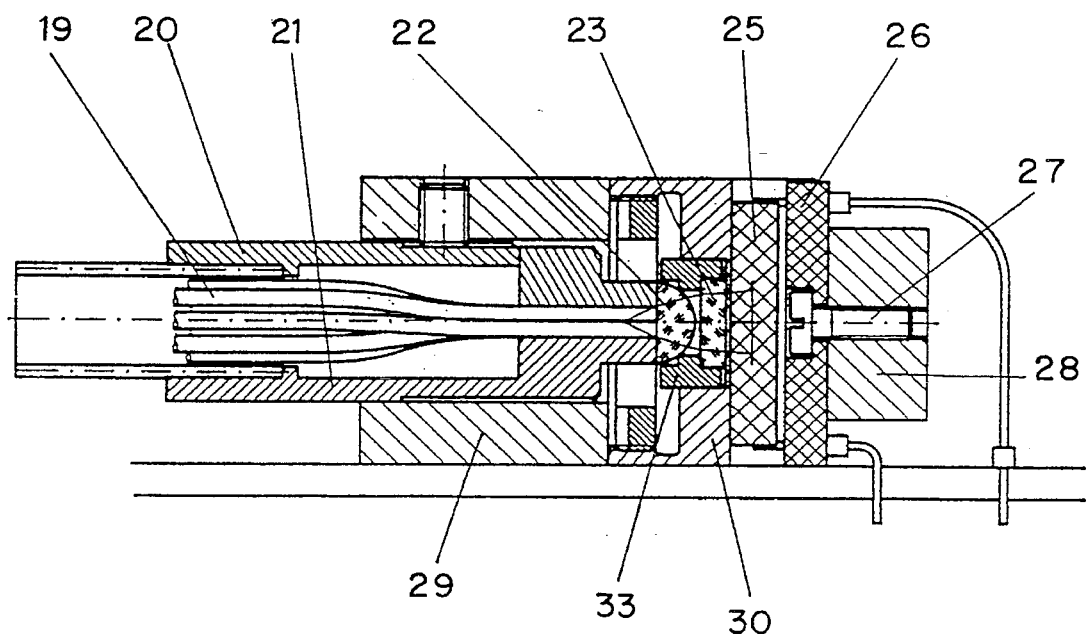
FIG. 2 shows a longitudinal section through a device, according to the invention, for determining the color value of a light flux.
Figures 3, 4:
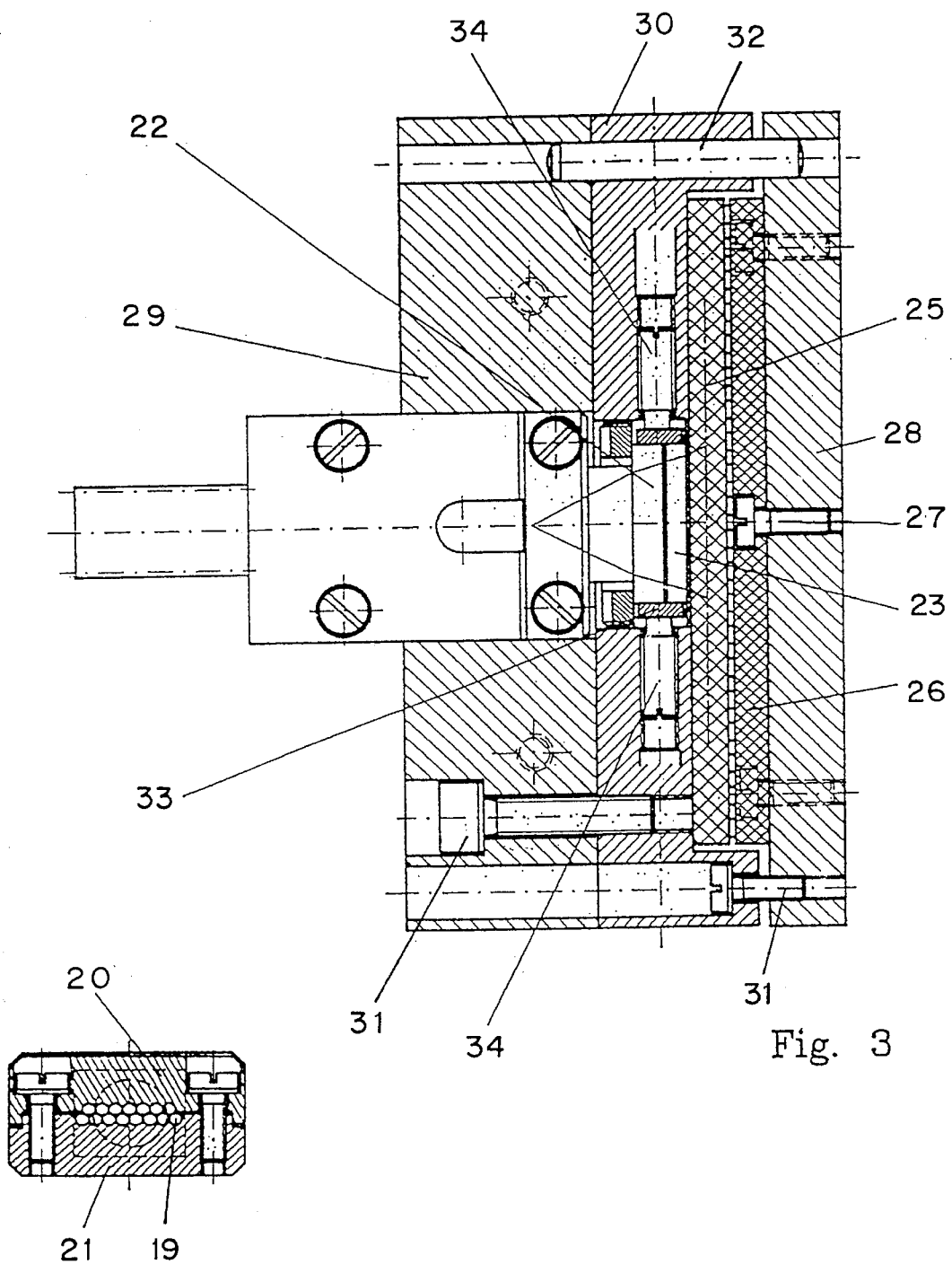
FIG. 3 shows, partially in section, a top view of the device according to FIG. 2.
FIG. 4 shows a partial view of the device according to FIG. 2, in the direction of the light-exit-side end faces of optical fibers.

FIGS. 2, 3 and 4 show the mechanical construction of the device according to the invention. Optical fibers 19, in this exemplary embodiment fifteen of them, are led from a scanner optics unit, not shown, to a two-part mount, which comprises the parts 20 and 21, and are clamped between these two parts 20, 21 such that these optical fibers 19 are outlined by a narrow flat rectangle. In the present case, the light exit ends of eight optical fibers 19 are arranged on one straight line, while the light exit ends of seven further optical fibers 19 are arranged on a straight line lying parallel to the first. The scanner optics unit can, for example, be of a construction such as is described in European Patent Application No. 94 107 164.9. The cones of radiation emerging from the optical fibers 19 are focused in one direction by means of a cylindrical lens 22 and deflected through a linear graded interference filter 23 onto separate PIN photodiodes 24, which are combined in one component 25 as an array. The component 25 is seated on a base 26, which is fastened to a basic body 28 by means of screws 27.

The basic body 28 is screwed and pinned to a clamping body upper part 29 and a clamping body center part 30. The corresponding screws are provided with the reference numeral 31 and the pins with the reference numeral 32.

The cylindrical lens 22 is combined with the graded interference filter 23 by means of a clamping frame 33 to form one constructional unit, which can be displaced by means of setting screws 34 in the direction of the filter gradient. As a result, it is possible to adjust precisely the wavelength range which is incident on an individual PIN photodiode 24.

All the photodiodes are arranged adjacent to one another on a straight line, the direction of the filter gradient extending parallel to this straight line. Extending likewise parallel hereto are the straight lines on which the light exit ends of the optical fibers 19 and the longitudinal direction of the cylindrical lens 22 are located.

Figure 5:
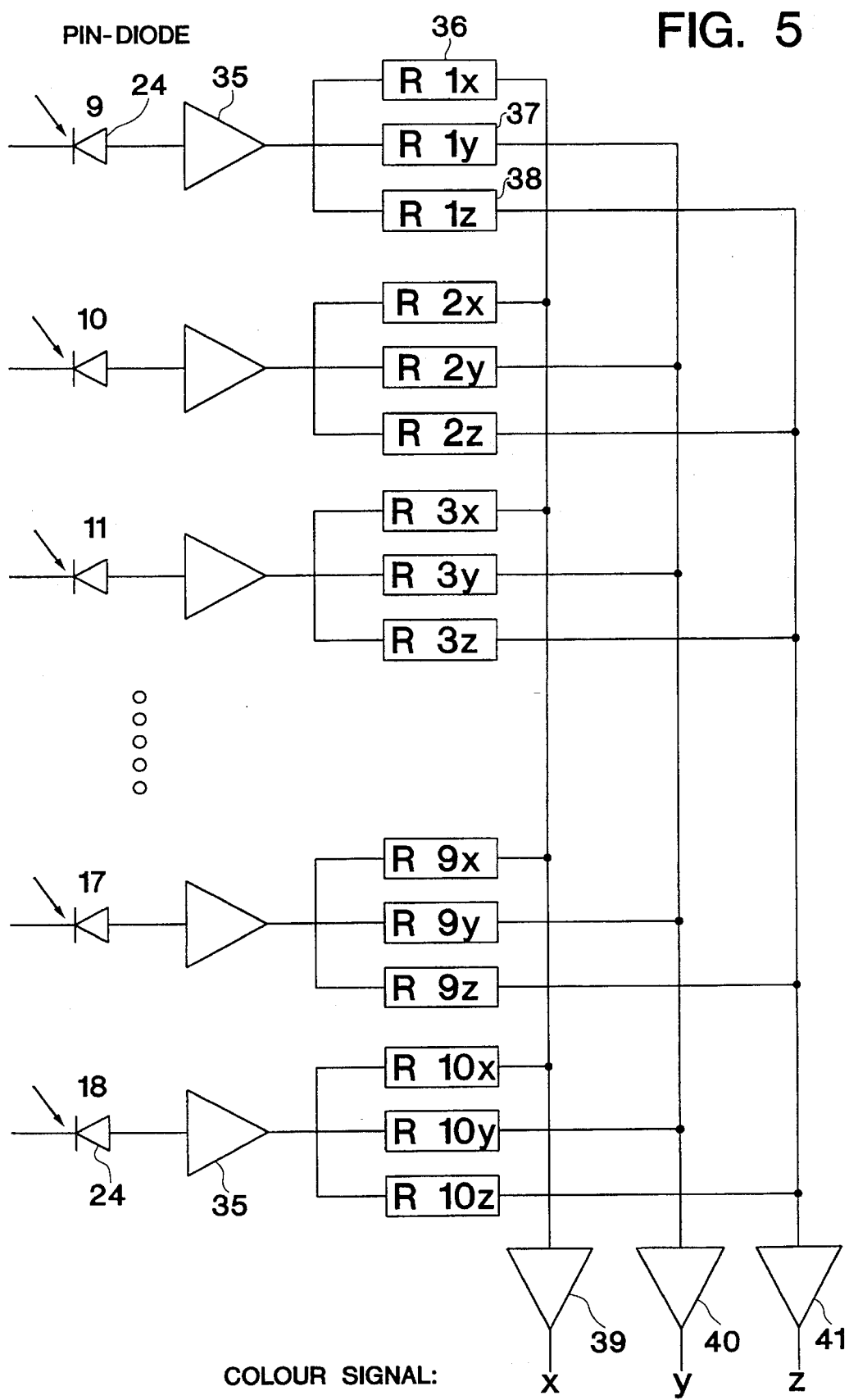
FIG. 5 shows an output-side interconnection of photodiodes of the device according to FIG. 2.

FIG. 5 shows the output-side interconnection of the PIN photodiodes 24. As already mentioned, for example ten photodiodes 24 are present, which are positioned relative to the graded interference filter 23 such that they are located at the reference points 9 to 18 in the diagram in accordance with FIG. 1. The numbers of these reference points are plotted separately above the respective photodiodes 24 in FIG. 5. Connected to the output of a respective photodiode 24 is a preamplifier 35 in each case, the output of which is led to a parallel circuit of in each case three resistors 36, 37 and 38. In this arrangement, the output of the resistor 36 is connected to a first output amplifier 39, the output of the resistor 37 to a second output amplifier 40 and the output of the resistor 38 to a third output amplifier 41. The same is correspondingly true of the other measuring channels formed in each case by one of the photodiodes and whose resistors are connected in the same manner to the said output amplifiers 39 to 41. At the outputs of these output amplifiers 39 to 41, the desired color signals X, Y and Z can then be picked off. The resistors, 36, 37 and 38 themselves have different values and are, furthermore, different from measuring channel to measuring channel, in order to determine, conforming to the standard spectral value curves known from colorimetrics, the contribution to the respective color signals by the measuring signal supplied in each case by means of one of photodiodes 24. The outputs of the output amplifiers 39, 40 and 41 are connected to a microcomputer which is then capable of synthesizing desired mixed colors using the color signals X, Y and Z fed to it.

The invention being thus described, it would be obvious that the same may be varied in many other ways. Such variations are not to be regarded as a departure from the spirit and scope of the invention, and also as modifications as would be obvious to one skilled in the art are intended to be included within the scope of the following claims.

I claim:

1. An apparatus for determining the color value of light emitted from a light source comprising:

a linear graded interference filter having only one expansion direction receiving said light, said light passing through said linear graded interference filter;

a plurality of PIN photodiodes receiving light passed through said linear graded interference filter, said plurality of PIN photodiodes being arranged adjacent to one another in said expansion direction of said linear graded interference filter, said plurality of PIN photodiodes outputting a measured signal for computing the color value of the light;

focussing optics, including a cylindrical lens extending in said expansion direction, arranged in front of said linear graded interference filter; and a plurality of optical fibers which deliver light from said light source to said focussing optics and having light exit ends arranged closely adjacent to one another along at least one row extending in said expansion direction of said linear graded interference filter.

2. The apparatus according to claim 1, wherein said linear graded interference filter has a band pass characteristic of 20 nm.

3. The apparatus according to claim 1, wherein said plurality of PIN photodiodes is ten PIN photodiodes.

4. An apparatus for determining the color value of light emitted from a light source comprising:

a linear graded interference filter having only one expansion direction receiving said light, said light passing through said linear graded interference filter;

a plurality of photodetectors receiving light passed through said linear graded interference filter, said plurality of photodetectors being arranged adjacent to one another in said expansion direction of said linear graded interference filter, said plurality of photodetectors outputting a measured signal for computing the color value of the light;

focussing optics, including a cylindrical lens extending in said expansion direction, arranged in front of said linear graded interference filter;

a plurality of optical guides which deliver light from said light source to said focussing optics and having light exit ends arranged closely adjacent to one another along at least one row extending in said expansion direction of said linear graded interference filter; and means for displacing said focussing optics and said linear graded interference filter, and said plurality of photodetectors, relative to one another in said expansion direction.

5. The apparatus according to claim 4, wherein said means for displacing comprises a common frame and means for clamping said focussing optics and said graded interference filter to said common frame.

6. The apparatus according to claim 5, wherein said common frame is displaceable in said expansion direction.

7. The apparatus according to claim 6, further comprising:

a central clamping body which contains said common frame; and a basic body which carries said plurality of photodetectors and which is rigidly connected to said clamping body.

8. The apparatus according to claim 7, further comprising a base fastened to said basic body, wherein said plurality of photodetectors form a single array, and said array is seated on said base.

9. The apparatus according to claim 7, further comprising an outer clamping body on a side of said central clamping body facing away from said basic body, wherein said outer clamping body receives the light exit ends of said plurality of optical guides in a fixed manner and is rigidly connected to said central clamping body.

10. The apparatus according to claim 9, wherein said central clamping body, said basic body, and said outer clamping body are pinned to one another.

11. An apparatus for determining the color value of light emitted from a light source comprising:

a linear graded interference filter having only one expansion direction, receiving said light, said light passing through said linear graded interference filter;

a plurality of photodetectors receiving light passed through said linear graded interference filter, said plurality of photodetectors being arranged adjacent to one another in said expansion direction of said linear graded interference filter, said plurality of photodetectors outputting a measured signal for computing the color value of the light;

focussing optics, including a cylindrical lens extending in said expansion direction, arranged in front of said linear graded interference filter;

a plurality of optical guides which deliver light from said light source to said focussing optics and having light exit ends arranged closely adjacent to one another along at least one row extending in said expansion direction of said linear graded interference filter;

three output amplifiers;

a plurality of parallel circuits of three resistors, outputs of said parallel circuits being connected to inputs of said three output amplifiers; and a plurality of preamplifiers connecting corresponding photodetectors of said plurality of photodetectors to corresponding parallel circuits of said plurality of parallel circuits.

12. An apparatus for determining the color value of light emitted from a light source comprising:

a linear graded interference filter having only one expansion direction receiving said light, said light passing through said linear graded interference filter;

a plurality of photodetectors receiving light passed through said linear graded interference filter, said plurality of photodetectors being arranged adjacent to one another in said expansion direction of said linear graded interference filter, said plurality of photodetectors outputting a measured signal for computing the color value of the light;

focussing optics, including a cylindrical lens extending in said expansion direction, arranged in front of said linear graded interference filter; and a plurality of optical guides which deliver light from said light source to said focussing optics and having light exit ends arranged closely adjacent to one another along at least one row extending in said expansion direction of said linear graded interference filter, wherein all the light input ends of said optical guides are directed onto the same point.

13. An apparatus for determining the color value of light emitted from a light source comprising:

a linear graded interference filter having only one expansion direction receiving said light, said light passing through said linear graded interference filter;

a plurality of photodetectors receiving light passed through said linear graded interference filter, said plurality of photodetectors being arranged adjacent to one another in said expansion direction of said linear graded interference filter, said plurality of photodetectors outputting a measured signal for computing the color value of the light;

focussing optics, including a cylindrical lens extending in said expansion direction, arranged in front of said linear graded interference filter; and a plurality of optical guides which deliver light from said light source to said focussing optics and having light exit ends arranged closely adjacent to one another along at least one row extending in said expansion direction of said linear graded interference filter, wherein said plurality of photodetectors comprises more than three photodetectors and said measured signal output from each photodetectors is a value for a chromaticity diagram, a connection of each of said values forming a polygonal approximation of a chromaticity diagram for all naturally occurring colors.

14. The apparatus according to claim 13, wherein said plurality of photodetectors is ten photodetectors and said polygonal approximation is as shown by the curve connecting points 9–18 in FIG. 1.

15. A method for determining the color value of light comprising the steps of:

delivering light from a light source to focussing optics;

focussing light using said focussing optics;

linear graded interference filtering focussed light in one expansion direction;

arranging more than three light detectors adjacent to one another in said expansion direction, said more than three light detectors receiving light from said filtering step;

outputting, from said more than three light detectors, measured values from which the color value is calculated; and displacing said focussing optics and said linear graded interference filter, and said plurality of photodetectors, relative to one another in said expansion direction.

16. A method for determining the color value of light comprising the steps of:

delivering light from a light source to focussing optics;

focussing light using said focussing Optics;

linear graded interference filtering focussed light in one expansion direction;

arranging more than three light detectors adjacent to one another in said expansion direction, said more than three light detectors receiving light from said filtering step;

outputting, from said more than three light detectors, measured values from which the color value is calculated;

plotting said measured values on a chromaticity diagram; and connecting plotted measured values to form a polygonal approximation of a chromaticity diagram for naturally occurring colors.

17. A method for determining the color value of light comprising the steps of:

delivering light from a light source to focussing optics;

focussing light using said focussing optics;

linear graded interference filtering focussed light in one expansion direction;

arranging more than three light detectors adjacent to one another in said expansion direction, said more than three light detectors receiving light from said filtering step, wherein said arranging step includes positioning said more than three light detectors along said expansion direction in order to form a polygonal approximation of the chromaticity diagram of natural colors; and outputting, from said more than three light detectors, measured values from which the color value is calculated.

18. The method according to claim 17, wherein said polygonal approximation is as shown by the curve connecting points 9–18 in FIG. 1.

19. A method for determining the color value of light comprising the steps of:

delivering light from a light source to focussing optics;

focussing light using said focussing optics;

linear graded interference filtering focussed light in one expansion direction;

arranging more than three light detectors adjacent to one another in said expansion direction, said more than three light detectors receiving light from said filtering step;

outputting, from said mote than three light detectors, measured values from which the color value is calculated;

inputting a measured signal, via a preamplifier, from each light detector to a corresponding parallel circuit of three resistors;

connecting, for each parallel circuit, an output of a first resistor to an input of a first output amplifier, an output of a second resistor to an input of a second output amplifier and an output of a third resistor to an input of a third output amplifier; and outputting, from said first, second and third output amplifiers, first, second and third color signals, respectively.

* * * * *